United States Patent
Honda et al.

(10) Patent No.: US 9,917,967 B2
(45) Date of Patent: Mar. 13, 2018

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Tokyo (JP)

(72) Inventors: Seiji Honda, Kanagawa (JP); Tomokazu Akuta, Kanagawa (JP); Takaki Saiki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/055,725

(22) Filed: Feb. 29, 2016

(65) Prior Publication Data
US 2017/0026532 A1    Jan. 26, 2017

(30) Foreign Application Priority Data
Jul. 21, 2015   (JP) .................................. 2015-144054

(51) Int. Cl.
*H04N 1/00* (2006.01)

(52) U.S. Cl.
CPC ..... *H04N 1/00888* (2013.01); *H04N 1/00904* (2013.01); *H04N 1/00925* (2013.01); *H04N 1/00933* (2013.01); *H04N 2201/0094* (2013.01)

(58) Field of Classification Search
None
See application file for complete search history.

(56) References Cited

U.S. PATENT DOCUMENTS

| 2005/0190707 | A1* | 9/2005 | Nishizawa | ........... H04N 1/0035 370/286 |
| 2013/0050725 | A1* | 2/2013 | Nakai | .................... G06K 15/02 358/1.9 |
| 2014/0160513 | A1* | 6/2014 | Niitsuma | ........... H04N 1/00244 358/1.14 |
| 2015/0193062 | A1* | 7/2015 | Wyatt | .................. G06F 3/0412 345/173 |

FOREIGN PATENT DOCUMENTS

| JP | 07154545 A | * | 6/1995 |
| JP | 2004-074530 A | | 3/2004 |
| JP | 2014-240197 A | | 12/2014 |

* cited by examiner

*Primary Examiner* — Fan Zhang
(74) *Attorney, Agent, or Firm* — Sughrue Mion, PLLC (57) ABSTRACT

An image processing apparatus includes a first controller, a second controller, and a third controller. The first controller controls an output unit that outputs an image. The second controller controls a reading unit that reads an image. The third controller controls, in response to receipt of a power reduction request, the first controller or the second controller to restrict performance of the output unit or the reading unit so as to satisfy the power reduction request.

7 Claims, 7 Drawing Sheets

| | | FULL | (2) | SCAN PRODUCTIVITY | | | |
| | | | | (4) REDUCTION 1 | (4) REDUCTION 1 | (4) REDUCTION 2 | (4) REDUCTION 3 |
| | | LEVEL 0 | LEVEL 1* | | | | |
| PRINT PRODUCTIVITY | FULL | 20% | — | 5% | 10% | 15% |
| | (3) REDUCTION 1 | 40% | — | 25% | 30% | 35% |
| | (3) REDUCTION 2 | 60% | — | 45% | 50% | 55% |
| | (3) REDUCTION 3 | 80% | — | 65% | 70% | 75% |
| | (5) STOP | | | 85% | 90% | 95% |

FIG. 8

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-144054 filed Jul. 21, 2015.

BACKGROUND

Technical Field

The present invention relates to an image processing apparatus, an image processing method, and a non-transitory computer readable medium.

SUMMARY

According to an aspect of the invention, there is provided an image processing apparatus including a first controller, a second controller, and a third controller. The first controller controls an output unit that outputs an image. The second controller controls a reading unit that reads an image. The third controller controls, in response to receipt of a power reduction request, the first controller or the second controller to restrict performance of the output unit or the reading unit so as to satisfy the power reduction request.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the attached drawings.

Figure 1:
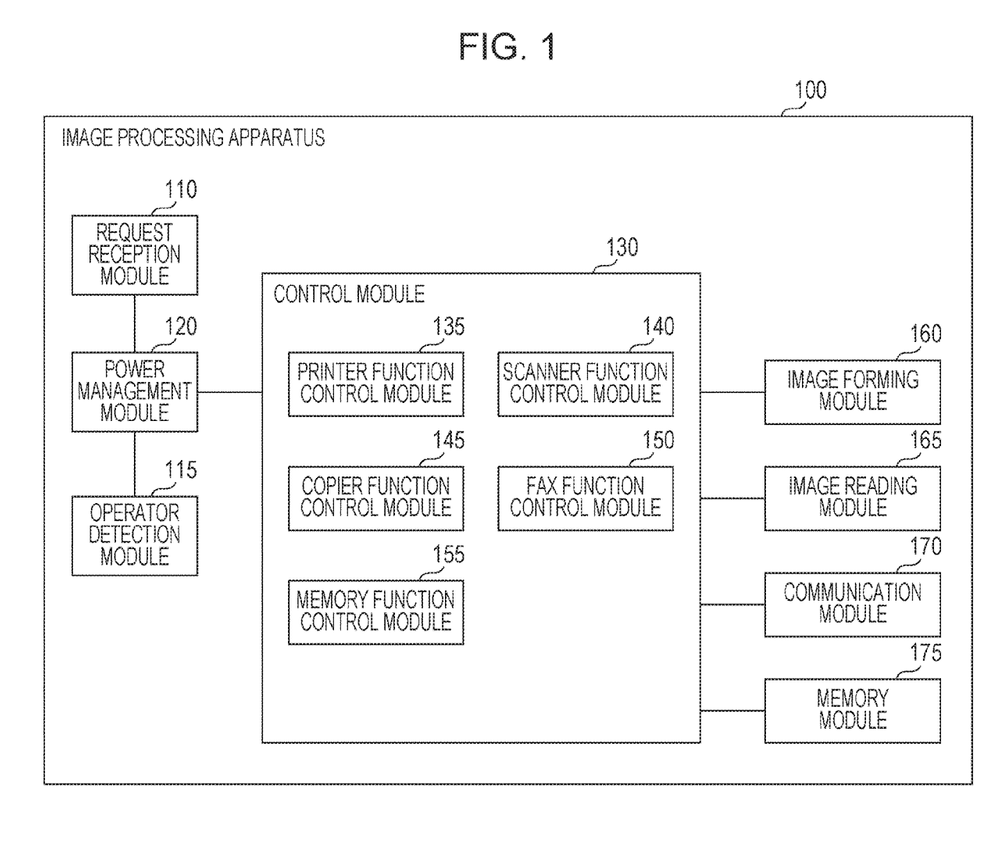
FIG. 1 is a conceptual module configuration diagram illustrating an example configuration according to the exemplary embodiment.

FIG. 1 is a conceptual module configuration diagram illustrating an example configuration according to the exemplary embodiment.

Modules are components of software (computer programs) or hardware that may be logically separated from one another in general. Thus, the modules according to the exemplary embodiment correspond to not only modules in a computer program but also modules in a hardware configuration. Therefore, the description of the exemplary embodiment includes a description of a computer program for causing a computer to function as those modules (a program for causing a computer to execute individual program steps, a program for causing a computer to function as individual units, or a program for causing a computer to implement individual functions), a system, and a method. For the convenience of description, expressions "store" and "cause ... to store", and expressions equivalent thereto will be used. These expressions specifically mean "cause a memory to store" or "perform control to cause a memory to store" in the case of a computer program. The modules may correspond to functions in a one-to-one relationship. In terms of packaging, a single module may be constituted by a single program, plural modules may be constituted by a single program, or a single module may be constituted by plural programs. Also, plural modules may be implemented by a single computer, or a single module may be implemented by plural computers in a distributed or parallel environment. Alternatively, a single module may include another module. Hereinafter, "connection" is used to refer to a logical connection (transmission and reception of data, an instruction, a reference relationship between pieces of data, etc.) as well as a physical connection. "Predetermined" means being determined before target processing, and includes the meaning of being determined in accordance with a present situation/state or in accordance with a previous situation/state before target processing after processing according to the exemplary embodiment starts, as well as before processing according to the exemplary embodiment starts. In a case where there are plural predetermined values, the plural predetermined values may be different from one another, or two or more of the values (of course including all the values) may be the same. A description having the meaning "in the case of A, B is performed" is used as the meaning "whether A or not is determined, and B is performed if it is determined A", except for a case where determination of whether A or not is unnecessary.

A system or apparatus may be constituted by plural computers, hardware units, devices, or the like connected to one another via a communication medium, such as a network (including communication connections having a one-to-one correspondence), or may be constituted by a single computer, hardware unit, device, or the like. "Apparatus" and "system" are used synonymously. Of course, "system" does not include a man-made social "organization" (social system).

Target information is read from a memory in individual processing operations performed by respective modules or in individual processing operations performed by a single module. After each processing operation has been performed, a processing result is written into the memory. Thus, a description of reading from the memory before a processing operation and writing into the memory after a processing operation may be omitted. Here, examples of the memory include a hard disk, a random access memory (RAM), an external storage medium, a memory connected through a communication network, a register in a central processing unit (CPU), and the like.

An image processing apparatus 100 according to the exemplary embodiment has a function of outputting and reading an image and reduces the power consumed by the image processing apparatus 100 in accordance with a power reduction request. As illustrated in FIG. 1, the image processing apparatus 100 includes a request reception module 110, an operator detection module 115, a power management module 120, a control module 130, an image forming module 160, an image reading module 165, a communication module 170, and a memory module 175.

The image processing apparatus 100 is an apparatus typically called a multifunction peripheral (an image processing apparatus having two or more functions among a scanner function, a printer function, a copier function, a fax function, an image storage function, and so forth). Here, the image processing apparatus 100 includes at least the scanner function and the printer function.

With concerns about power saving under the recent situation of global warming and power shortage, there is a trend to cope with total amount regulations or peak shift by using a technique of automatically managing power, such as a home energy management system (HEMS) or a building energy management system (BEMS) using a smart meter or the like, represented by Internet of Things (IoT) in which things are connected to the Internet. In such circumstances, a multifunction peripheral is also required to reduce power consumption in accordance with a power reduction request provided from a smart meter or the like.

Figure 8:
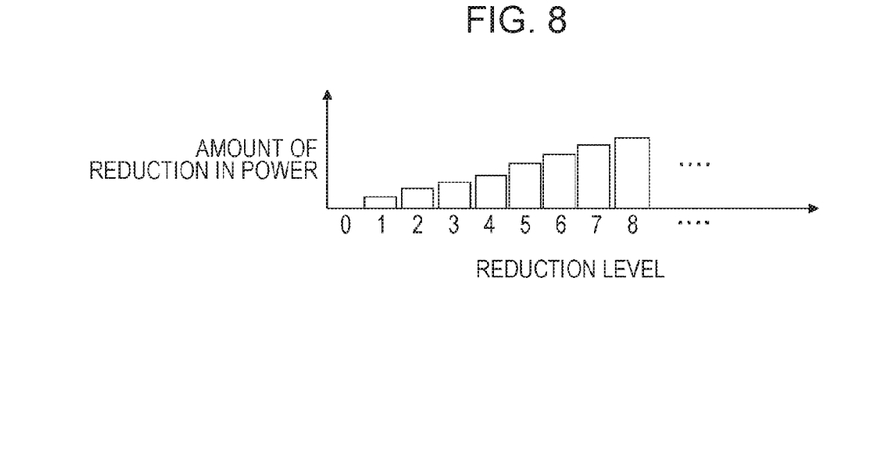
FIG. 8 is an explanatory diagram illustrating a relationship between a reduction level and an amount of reduction in power.

The request reception module 110 is connected to the power management module 120. The request reception module 110 receives a power reduction request. For example, the request reception module 110 receives a power reduction request from a smart meter or the like via a communication network. The power reduction request may include information representing plural reduction levels indicating an amount of power to be reduced. For example, as illustrated in FIG. 8, a definition may be made to increase the effect of power reduction as the reduction level increases.

The operator detection module 115 is connected to the power management module 120. The operator detection module 115 detects an operator who is operating the image processing apparatus 100. For example, a human sensor may be provided in the image processing apparatus 100, and a detection result obtained from the human sensor may be used. In a case where the image processing apparatus 100 has a function of identifying an operator (who is authorized to use the image processing apparatus 100) by using an IC card or the like, it may be determined that there is an operator when the data stored in the IC card is readable (specifically, when the IC card is in a card reader). Alternatively, in a case where the image processing apparatus 100 includes a camera and performs face recognition of an operator, it may be determined that there is an operator while an image of the operator is being captured.

The image processing apparatus 100 includes, to function as a multifunction peripheral, the image forming module 160, the image reading module 165, the communication module 170, and the memory module 175. The image processing apparatus 100 may include at least the image forming module 160 and the image reading module 165.

The image forming module 160 is connected to the control module 130. The image forming module 160 is a printer and prints an image for which a print instruction has been provided. The image forming module 160 may be used as a print function in a copy function and a fax function.

The image reading module 165 is connected to the control module 130. The image reading module 165 is a scanner and reads an image. The image reading module 165 may be used as a reading function in a copy function and a fax function.

The communication module 170 is connected to the control module 130. The communication module 170 performs, with another apparatus, communication in which an image is handled in many cases. The communication module 170 may be used as a communication function in a fax function.

The memory module 175 is connected to the control module 130. The memory module 175 stores an image read by the image reading module 165 and an image received from another apparatus (an image received by fax, an image to be printed by the printer, and so forth). The image stored in the memory module 175 is, for example, a target to be printed by the image forming module 160 or a target to be transmitted to another apparatus. Examples of the target to be transmitted to another apparatus include an image to be transmitted by fax and an image to be stored in an image memory. The memory module 175 is included in the image processing apparatus 100 in the example illustrated in FIG. 1, but may be outside the image processing apparatus 100, for example, in another apparatus (an apparatus serving as a repository or another image processing apparatus 100) connected through a communication network.

The control module 130 includes a printer function control module 135, a scanner function control module 140, a copier function control module 145, a fax function control module 150, and a memory function control module 155, and is connected to the power management module 120, the image forming module 160, the image reading module 165, the communication module 170, and the memory module 175. The control performed by the modules included in the control module 130 includes control of the original function of the image forming module 160 and so forth, and also includes performance restrictions to reduce the power consumed by the image forming module 160 and so forth under the control performed by the power management module 120.

The printer function control module 135 controls the image forming module 160 that outputs an image. The printer function control module 135 restricts the performance of the image forming module 160 in order to reduce the power consumed by the image forming module 160. The performance includes printing speed, resolution, and switching between color print and monochrome print. Here, a description will be given of restriction of printing speed. For example, a fixing unit in the image forming module 160 may be controlled.

The scanner function control module 140 controls the image reading module 165 that reads an image. The scanner function control module 140 restricts the performance of the image reading module 165 in order to reduce the power consumed by the image reading module 165. The performance includes reading speed, resolution, and switching between a color reading mode and a monochrome reading mode. Here, a description will be given of restriction of reading speed. For example, control may be performed so that the printing speed in the image forming module 160 matches the reading speed in the image reading module 165 (so that the printing speed is equal to the reading speed). Typically, the reading speed is higher than the printing speed. The reading speed may be decreased to be equal to the printing speed in order to guarantee the copy function.

The copier function control module 145 controls the image reading module 165 and the image forming module 160 in order to implement the copier function. The copier function control module 145 restricts the performance of the image reading module 165 and the image forming module 160 in order to reduce the power consumed by the image reading module 165 and the image forming module 160. The copier function control module 145 restricts the performance of the image reading module 165 and the image forming module 160 in the above-described manner.

The fax function control module 150 controls the image reading module 165, the image forming module 160, and the communication module 170. The fax function control module 150 restricts the performance of the image reading module 165 and the image forming module 160 in order to reduce the power consumed by the image reading module 165, the image forming module 160, and the communication module 170. The fax function control module 150 restricts the performance of the image reading module 165 and the image forming module 160 in the above-described manner.

The memory function control module 155 controls the memory module 175 that stores an image.

It is difficult to reduce the power consumed by the communication module 170 and the memory module 175, and thus the performance of the image forming module 160 and the image reading module 165 that are used together with the communication module 170 and the memory module 175 is restricted.

The power management module 120 is connected to the request reception module 110, the operator detection module 115, and the control module 130. The power management module 120 controls the individual modules included in the control module 130 and restricts the performance of the image forming module 160 or the image reading module 165.

The power management module 120 controls, in response to receipt of a power reduction request in the request reception module 110, the printer function control module 135 or the scanner function control module 140 to restrict the performance of the image forming module 160 or the image reading module 165 so as to satisfy the power reduction request.

In a case where an operator is detected by the operator detection module 115 and in a case where the image reading module 165 and the image forming module 160 are used, the power management module 120 may perform control to restrict the performance of the image forming module 160 so as to satisfy the power reduction request, without restricting the performance of the image reading module 165 while the operator is detected (while the operator is near the image processing apparatus 100).

The power management module 120 may perform control so that the reading speed in the image reading module 165 matches the speed in the image forming module 160.

In a case where the memory module 175 and the image forming module 160 are used, the power management module 120 may perform control to restrict the performance of the image forming module 160 so as to satisfy the power reduction request.

Figure 2:
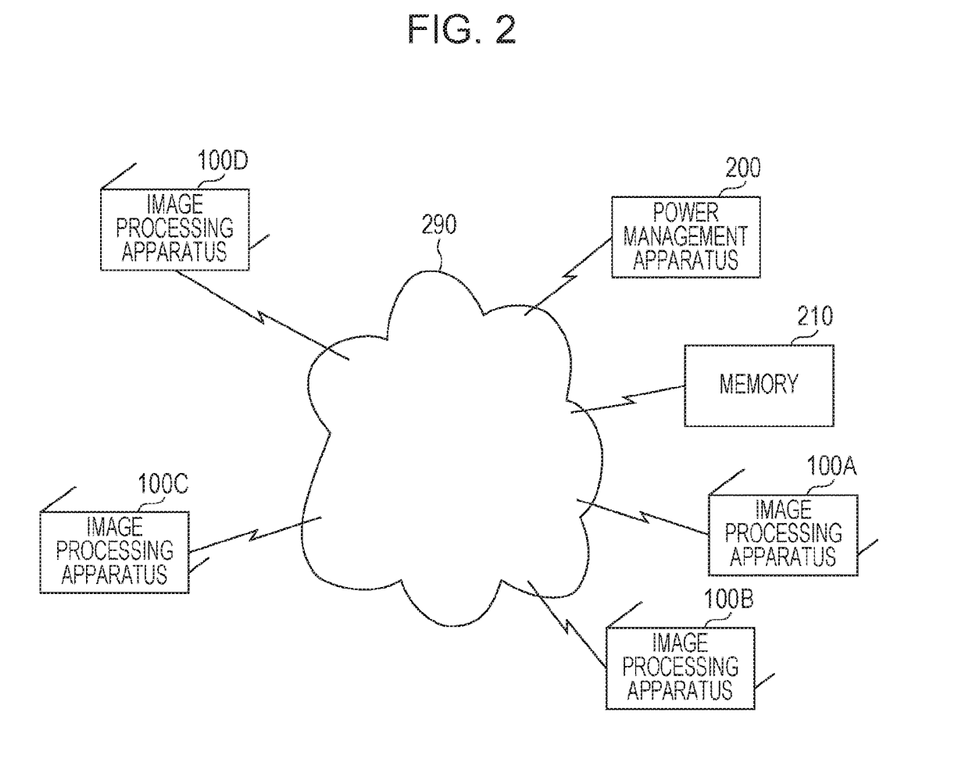
FIG. 2 is an explanatory diagram illustrating an example of a system configuration according to the exemplary embodiment.

FIG. 2 is an explanatory diagram illustrating an example of a system configuration according to the exemplary embodiment.

An image processing apparatus 100A, an image processing apparatus 100B, an image processing apparatus 100C, an image processing apparatus 100D, a power management apparatus 200, and a memory 210 are connected to one another via a communication network 290. The communication network 290 may be a wireless network, a wired network, or a combination thereof, and may be the Internet or an intranet serving as a communication infrastructure. The power management apparatus 200 monitors the amount of power consumed by the image processing apparatuses 100 in units of buildings or offices and provides a power reduction request to the image processing apparatuses 100. The power management apparatus 200 corresponds to, for example, a power management center apparatus or a smart meter in HEMS or BEMS. The memory 210 includes the above-described memory module 175. For example, the image processing apparatus 100B may use the memory 210 via the communication network 290, without including the memory module 175 therein. An image stored in the memory 210 may be printed by the image processing apparatus 100C.

Figure 3:
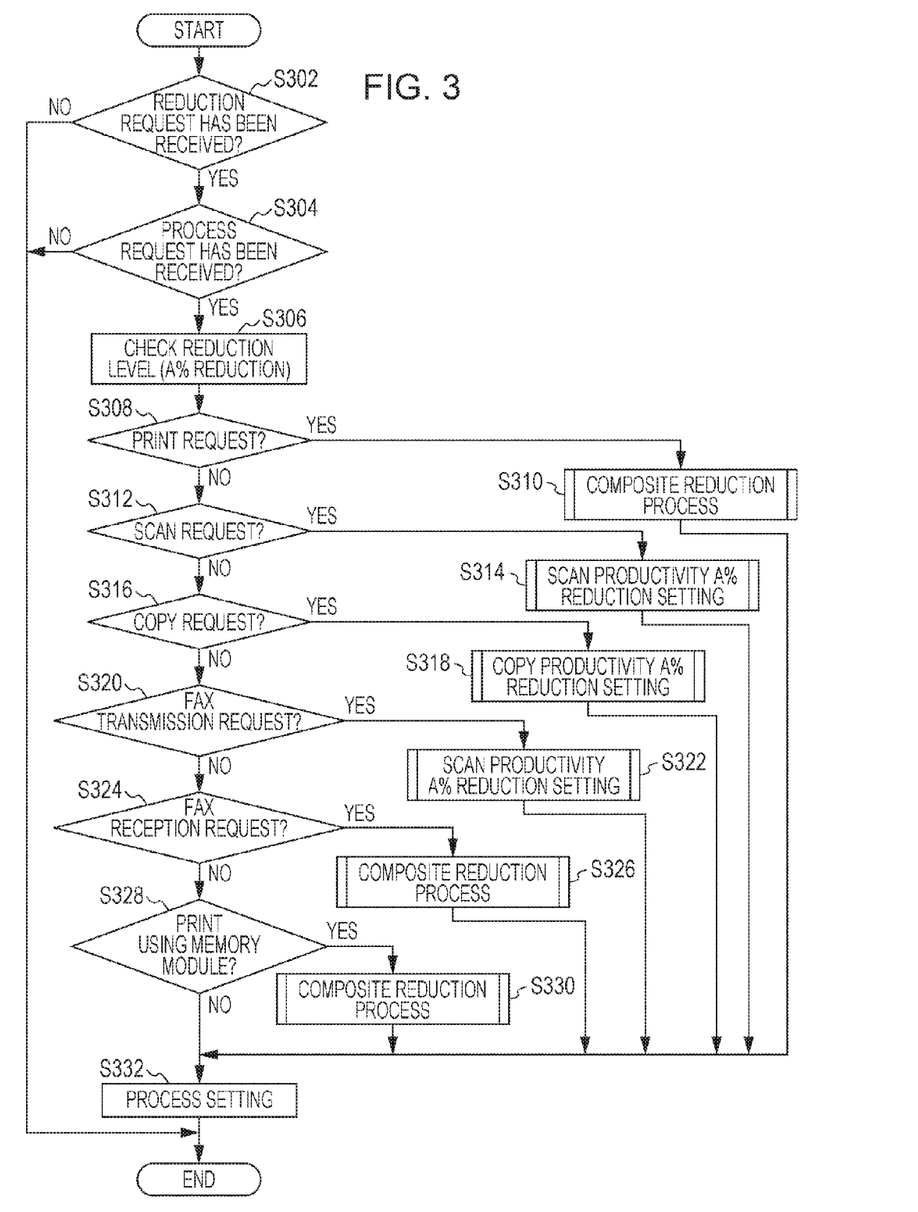
FIG. 3 is a flowchart illustrating an example of a process according to the exemplary embodiment.

FIG. 3 is a flowchart illustrating an example of a process according to the exemplary embodiment.

In step S302, the request reception module 110 determines whether or not a reduction request has been received from the power management apparatus 200. If a reduction request has been received, the process proceeds to step S304. Otherwise the process ends.

In step S304, the control module 130 determines whether or not a process request (also referred to as a job) for a process in the image processing apparatus 100 has been received. If a process request has been received, the process proceeds to step S306. Otherwise the process ends. Examples of the process request include a print request, a scan request, a copy request, a fax transmission request, a fax reception request, and a request for accessing the memory to the image processing apparatus 100. The process request may be generated in response to an operation directly performed by an operator on the image processing apparatus 100 (an operation on a button or the like displayed on a liquid crystal display or the like of the image processing apparatus 100) or may be generated in response to an instruction provided from a personal computer or the like via a communication network.

In step S306, the power management module 120 checks a reduction level (A % reduction). Specifically, the power management module 120 extracts a percentage corresponding to the reduction level.

In step S308, the power management module 120 determines whether or not the process request is a print request. If the process request is a print request, the process proceeds to step S310. Otherwise the process proceeds to step S312.

In step S310, a composite reduction process is performed. The details of the composite reduction process will be described below with reference to the flowchart illustrated in FIG. 4.

In step S312, the power management module 120 determines whether or not the process request is a scan request. If the process request is a scan request, the process proceeds to step S314. Otherwise the process proceeds to step S316.

In step S314, a scan productivity A % reduction setting is performed. The details of the setting will be described below with reference to the flowchart illustrated in FIG. 5.

In step S316, the power management module 120 determines whether or not the process request is a copy request. If the process request is a copy request, the process proceeds to step S318. Otherwise the process proceeds to step S320.

In step S318, a copy productivity A % reduction setting is performed. The details of the setting will be described below with reference to the flowchart illustrated in FIG. 5.

In step S320, the power management module 120 determines whether or not the process request is a fax transmission request. If the process request is a fax transmission request, the process proceeds to step S322. Otherwise the process proceeds to step S324.

In step S322, a scan productivity A % reduction setting is performed. The details of the setting will be described below with reference to the flowchart illustrated in FIG. 5.

In step S324, the power management module 120 determines whether or not the process request is a fax reception request. If the process request is a fax reception request, the process proceeds to step S326. Otherwise the process proceeds to step S328.

In step S326, a composite reduction process is performed. The details of the composite reduction process will be described below with reference to the flowchart illustrated in FIG. 4.

In step S328, the power management module 120 determines whether or not the process request is a print request for performing a printing process using the memory module 175. If the process request is a print request for performing a printing process using the memory module 175, the process proceeds to step S330. Otherwise the process proceeds to step S332.

In step S330, a composite reduction process is performed. The details of the composite reduction process will be described below with reference to the flowchart illustrated in FIG. 4.

In step S332, the control module 130 performs a process setting. In accordance with the setting for power reduction, the image forming module 160, the image reading module 165, the communication module 170, and the memory module 175 perform a process in response to the process request.

The order of performing determination in steps S308, S312, S316, S320, S324, and S328 is not necessarily the above-described order. Alternatively, the determination in step S308 may be performed first, and after that determination may be performed in any order. Of course, the order may be limited to that illustrated in FIG. 3.

Figure 4:
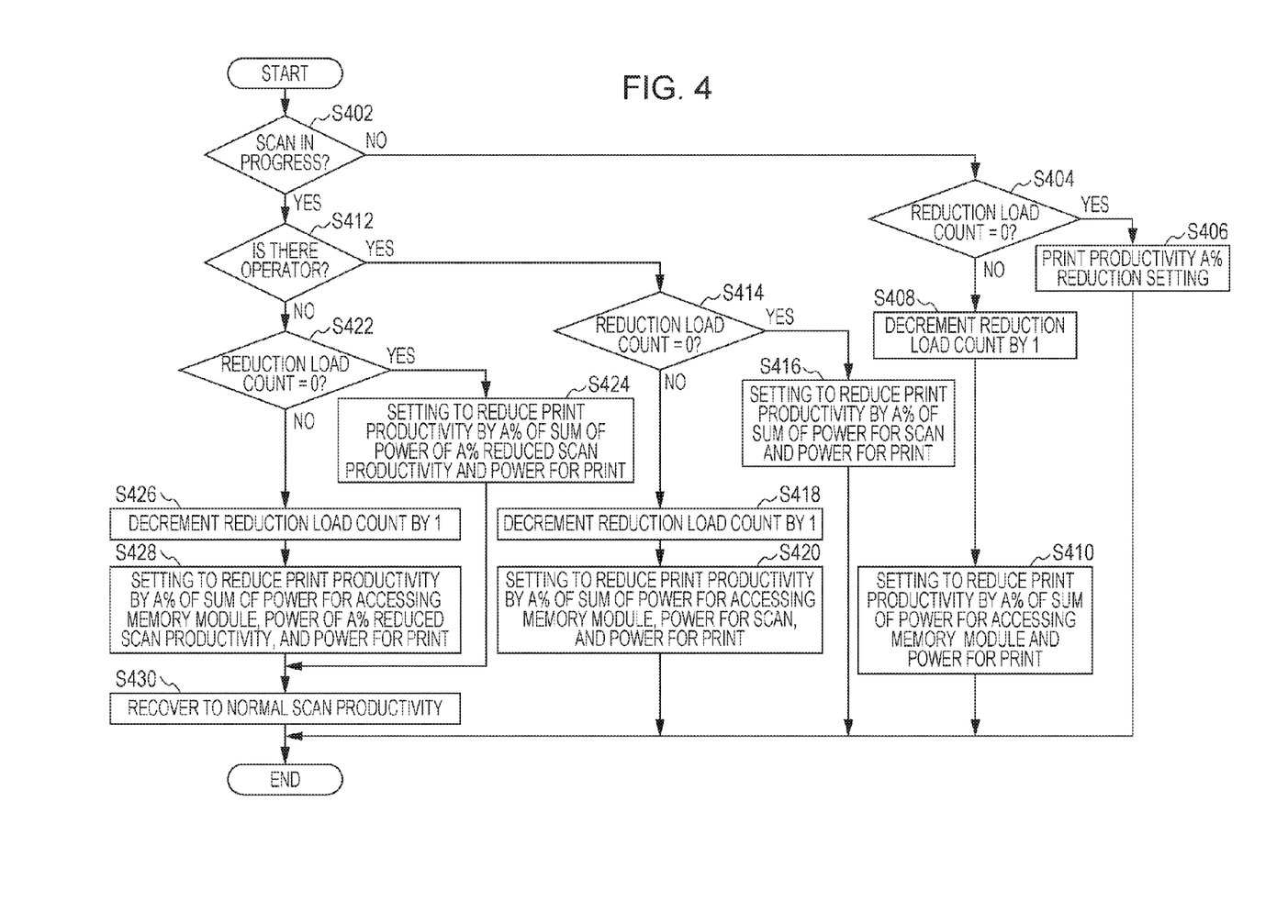
FIG. 4 is a flowchart illustrating an example of a process according to the exemplary embodiment.

FIG. 4 is a flowchart illustrating an example of a process (mainly performed by the power management module 120 and the control module 130) according to the exemplary embodiment. The image forming module 160 and another module (for example, the image reading module 165 or the memory module 175) may operate at the same time, and the process corresponds to such a case. A reduction load count is information indicating whether or not the memory module 175 is accessed. The details of this will be described below with reference to the flowchart illustrated in FIG. 6.

In step S402, it is determined whether or not scan is in progress. If scan is in progress (if a print request has been received and scan is in progress), the process proceeds to step S412. Otherwise the process proceeds to step S404.

In step S404, it is determined whether or not the reduction load count=0. If the reduction load count=0, the process proceeds to step S406. Otherwise (if a print request has been received and the memory module 175 is accessed), the process proceeds to step S408.

In step S406, a print productivity A % reduction setting is performed. That is, since the process is performed by the image forming module 160 alone, the performance of the image forming module 160 is restricted so as to be reduced by A %.

In step S408, the reduction load count is decremented by one. That is, the reduction load count is reset.

In step S410, a setting is performed to reduce the print productivity by A % of the sum of the power for accessing the memory module 175 and the power for print. That is, since a process by the image forming module 160 and access to the memory module 175 are being performed, restriction is performed to reduce the performance of the image forming module 160 in order to reduce the power consumed by the entire image processing apparatus 100 by A %. Therefore, the reduction percentage for the image forming module 160 is A % or more.

In step S412, it is determined, based on a detection result obtained from the operator detection module 115, whether or not there is an operator near the image processing apparatus 100. If there is an operator, the process proceeds to step S414. Otherwise, the process proceeds to step S422. If there is an operator, it means that the scan process is being performed in response to an instruction provided by the operator. In this case, the performance of the image reading module 165 is not reduced but the performance of the image forming module 160 is reduced. In this case, the performance of the image forming module 160 is reduced to satisfy the reduction request, and thus the performance of the image forming module 160 is reduced with a value of A % or more.

In step S414, it is determined whether or not the reduction load count=0. If the reduction load count=0, the process proceeds to step S416. Otherwise the process proceeds to step S418.

In step S416, a setting is performed to reduce the print productivity by A % of the sum of the power for scan and the power for print. That is, since a process by the image forming module 160 and a process by the image reading module 165 are being performed and the processing performance of the image reading module 165 is not to be reduced, restriction is performed to reduce the performance of the image forming module 160 in order to reduce the power consumed by the entire image processing apparatus 100 by A %. Therefore, the reduction percentage for the image forming module 160 is A % or more.

In step S418, the reduction load count is decremented by one. That is, the reduction load count is reset.

In step S420, a setting is performed to reduce the print productivity by A % of the sum of the power for accessing the memory module 175, the power for scan, and the power for print. That is, since a process by the image forming module 160, a process by the image reading module 165, and access to the memory module 175 are being performed, and access to the memory module 175 is being performed without reducing the processing performance of the image reading module 165, restriction is performed to reduce the performance of the image forming module 160 in order to reduce the power consumed by the entire image processing apparatus 100 by A %. Therefore, the reduction percentage for the image forming module 160 is A % or more.

In step S422, it is determined whether or not the reduction load count=0. If the reduction load count=0, the process proceeds to step S424. Otherwise the process proceeds to step S426.

In step S424, a setting is performed to reduce the print productivity by A % of the sum of the power of A % reduced scan productivity and the power for print. That is, since a process by the image forming module 160, a process by the image reading module 165, and access to the memory module 175 are not being performed, restriction is performed to reduce the performance of the image reading module 165 by A % and to reduce the performance of the image forming module 160 in order to reduce the power consumed by the entire image processing apparatus 100 by A %.

In step S426, the reduction load count is decremented by one. That is, the reduction load count is reset.

In step S428, a setting is performed to reduce the print productivity by A % of the sum of the power for accessing the memory module 175, the power of A % reduced scan productivity, and the power for print. That is, since a process by the image forming module 160, a process by the image reading module 165, and access to the memory module 175 are being performed, restriction is performed to reduce the performance of the image forming module 160 in order to reduce the power consumed by the entire image processing apparatus 100 by A %.

In step S430, the scan performance is recovered to obtain normal productivity after the job has been completed.

If scan or print is finished first, the productivity of the module executing the job may be increased by the amount of power that had been used in the finished job (scan or print).

If a process by the image reading module 165 is being performed and there is not an operator (NO in step S412), the performance of the image reading module 165 may be kept reduced without recovering it.

Figure 5:
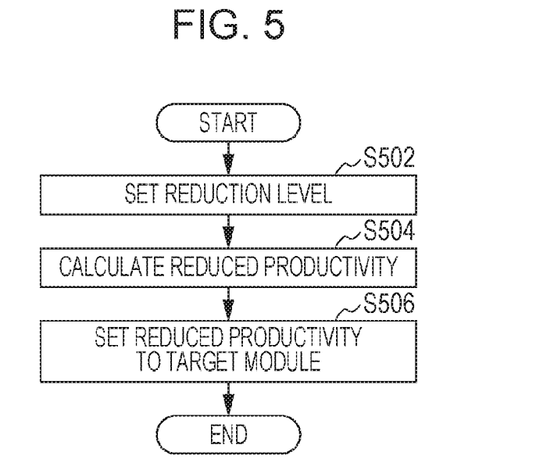
FIG. 5 is a flowchart illustrating an example of a process according to the exemplary embodiment.

FIG. 5 is a flowchart illustrating an example of a process according to the exemplary embodiment.

In step S502, a reduction level is set. A reduction percentage corresponding to the power reduction request is used.

In step S504, reduced productivity is calculated, for example, in the following manner.

Reduction request for scan process (a case where a process is being performed by the image reading module 165 alone)

Reduced productivity=maximum productivity of the image reading module 165×(1−reduction percentage)

Reduction request for print process (a case where a process is being performed by the image forming module 160 alone)

Reduced productivity=maximum productivity of the image forming module 160×(1−reduction percentage)

For a reduction request for a concurrent process (a case where a process by the image forming module 160 and a process by the image reading module 165 are being performed in parallel), a power reduction control matrix 700 is used. The power reduction control matrix 700 will be described below with reference to FIG. 7.

In step S506, the reduced productivity is set to a target module. A job is performed in accordance with the set productivity.

Figure 6:
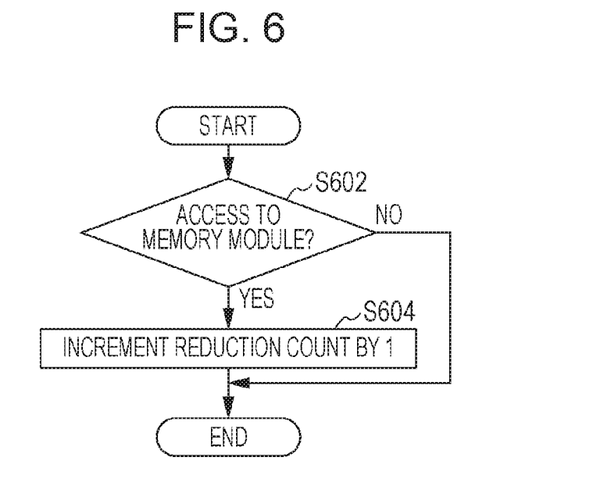
FIG. 6 is a flowchart illustrating an example of a process according to the exemplary embodiment.

FIG. 6 is a flowchart illustrating an example of a process according to the exemplary embodiment.

In step S602, it is determined whether or not access to the memory module 175 is being performed. If it is determined that access to the memory module 175 is being performed, the process proceeds to step S604. Otherwise the process ends.

In step S604, the reduction count is incremented by one. That is, the reduction count is set. The reduction count is reset by decrementing it by one.

Figure 7:
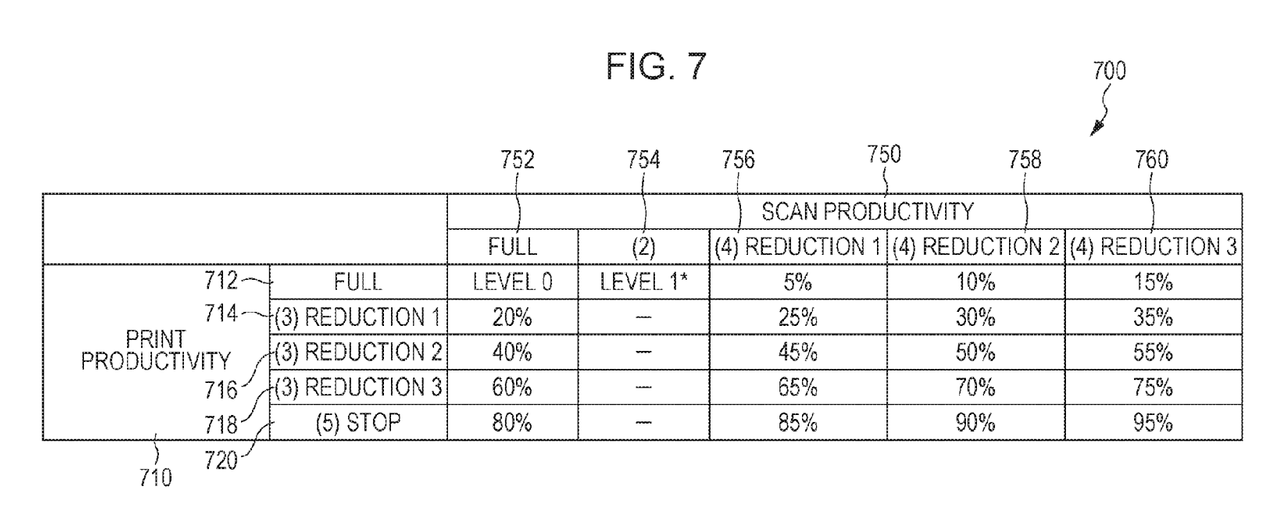
FIG. 7 is an explanatory diagram illustrating an example of the data structure of a power reduction control matrix.

FIG. 7 is an explanatory diagram illustrating an example of the data structure of the power reduction control matrix 700.

The power reduction control matrix 700 includes a print productivity field 710 in the row direction and a scan productivity field 750 in the column direction.

The print productivity field 710 includes a full field 712, a (3) reduction 1 field 714, a (3) reduction 2 field 716, a (3) reduction 3 field 718, and a (5) stop field 720. The scan productivity field 750 includes a full field 752, a (2) field 754, a (4) reduction 1 field 756, a (4) reduction 2 field 758, and a (4) reduction 3 field 760. Here, "full" means delivering the performance of the image forming module 160 or the image reading module 165 without reducing power.

The value in the (2) field 754 is determined by the productivity of the image forming module 160. This means that the productivity of the image reading module 165 is matched with the productivity of the image forming module 160 (the speeds in both modules are set to be the same). This is applied especially in a copy process (step S318).

For example, in a case where a scan process by the image reading module 165 is being performed, the (5) stop field 720 may be handled (the process by the image forming module 160 may be stopped).

With the power reduction control matrix 700, any one of the following control operations is performed: (i) the scan productivity of the image reading module 165 is matched with the print productivity of the image forming module 160 by using "(2) field 754"; (ii) the print productivity of the image forming module 160 is changed by using "(3) reduction 1 field 714, (3) reduction 2 field 716, and (3) reduction 3 field 718"; (iii) the scan productivity of the image reading module 165 is changed by using "(4) reduction 1 field 756, (4) reduction 2 field 758, and (4) reduction 3 field 760"; and (iv) the print process by the image forming module 160 is stopped during a scan process by the image reading module 165 by using "(5) stop field 720".

A combination in the power reduction control matrix 700 is used only in a concurrent process. After the print process by the image forming module 160 or the scan process by the image reading module 165 is finished, the residual productivity is changed in accordance with a target level.

For example, after a scan process controlled in reduction level 10 is finished, the reduction level is changed to reduction level 4.

Regarding selection of a reduction level, in a case where there is an operator of the image processing apparatus 100 (in a case where there is a person near the image processing apparatus 100), for example, in a case where a copy process is being performed, control is performed such that the scan productivity of the image reading module 165 is not reduced and the productivity is reduced only in the print process performed by the image forming module 160 that is concurrently operating to conform to the target reduction level, and thereby energy saving is realized with the operability ensured.

Further, with a power sensor being mounted, control is performed in which the power reduction control matrix 700 is searched for the productivity that matches a target level.

Further, with a concurrent process being performed, it may be determined whether or not the power to be used by an apparatus exceeds the power rating of the apparatus (for example, 1.5 kVA). If the power exceeds the power rating, a power rating may be selected from the power reduction control matrix 700 and control may be performed so that the power consumption does not exceed the power rating.

Figure 9:
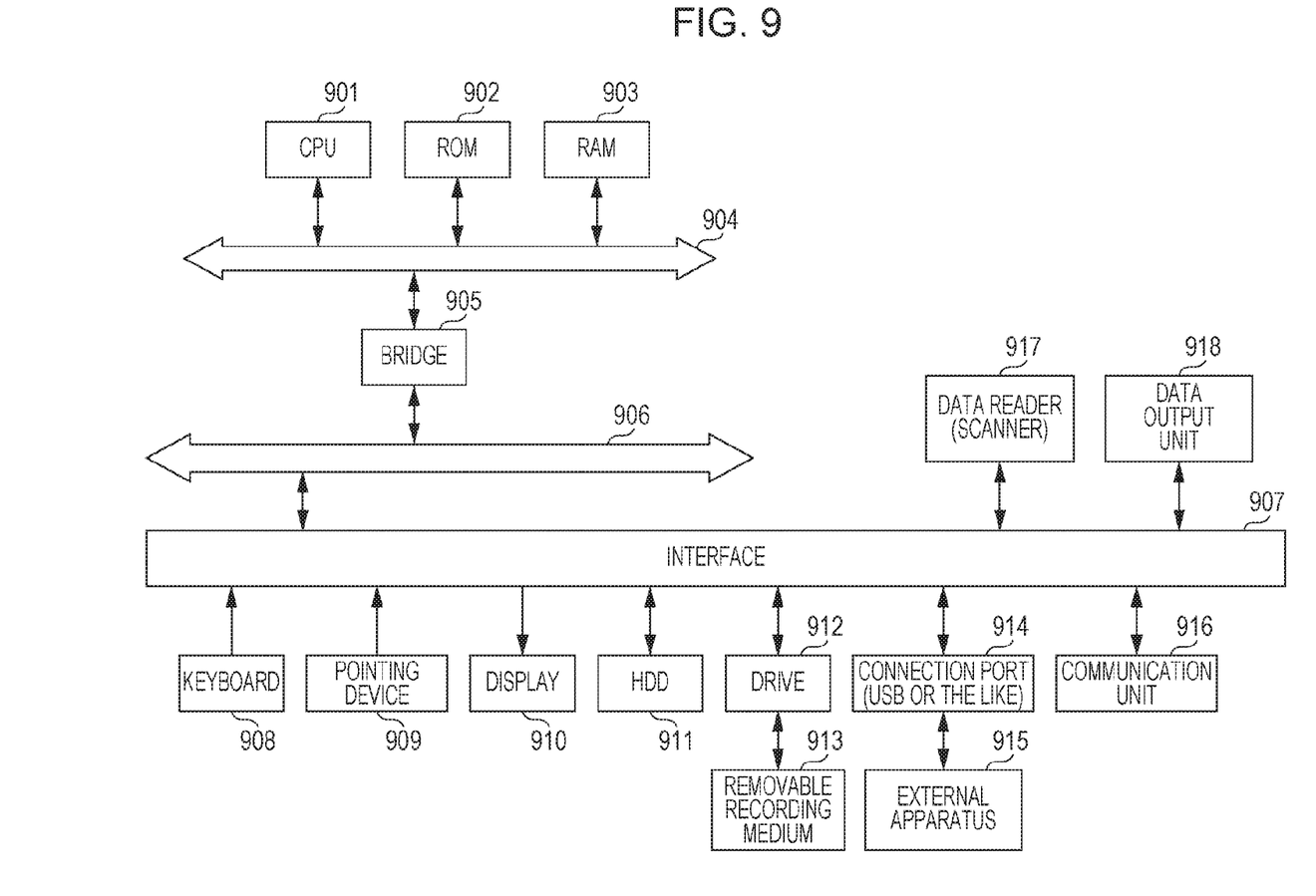
FIG. 9 is a block diagram illustrating an example of the hardware configuration of a computer that implements the exemplary embodiment.

An example of the hardware configuration of the image processing apparatus according to the exemplary embodiment will be described with reference to FIG. 9. The configuration illustrated in FIG. 9 is a configuration of, for example, a personal computer (PC) or the like, and includes a data reader 917 such as a scanner and a data output unit 918 such as a printer.

A central processing unit (CPU) 901 is a controller that executes processes in accordance with a computer program describing the execution sequence of individual modules described in the exemplary embodiment, that is, the request reception module 110, the operator detection module 115, the power management module 120, the control module 130, the printer function control module 135, the scanner function control module 140, the copier function control module 145, the fax function control module 150, and the memory function control module 155.

A read only memory (ROM) 902 stores programs and arithmetic parameters used by the CPU 901. A random access memory (RAM) 903 stores programs used for execution by the CPU 901 and parameters that change in the execution according to necessity. These components are connected to one another by a host bus 904, which is a CPU bus or the like.

The host bus 904 is connected to an external bus 906, such as a peripheral component interconnect/interface (PCI) via a bridge 905.

A keyboard 908 and a pointing device 909 such as a mouse are input devices operated by an operator. A display 910 may be a liquid crystal display or a cathode ray tube (CRT) and displays various pieces of information in the form of text or image information.

A hard disk drive (HDD) 911 includes a hard disk (or a flash memory or the like), drives the hard disk, and records or reproduces a program executed by the CPU 901 and information. The hard disk stores a power reduction request, the power reduction control matrix 700, and so forth. Further, the hard disk stores other various pieces of data and various computer programs.

A drive 912 reads data or a program recorded on a removable recording medium 913 loaded therein, such as a magnetic disk, an optical disc, a magneto-optical disc, or a semiconductor memory, and supplies the data or the program to the RAM 903 connected through an interface 907, the external bus 906, the bridge 905, and the host bus 904. The removable recording medium 913 is also available as a data recording area similar to the hard disk.

A connection port 914 is a port for connecting an external apparatus 915 and includes a connection unit compatible with universal serial bus (USB), IEEE 1394, or the like. The connection port 914 is connected to the CPU 901 and so forth through the interface 907, the external bus 906, the bridge 905, and the host bus 904. A communication unit 916 is connected to a communication network and performs a data communication process with the outside. The data reader 917 is a scanner, for example, and performs a document reading process. The data output unit 918 is a printer, for example, and performs a document data output process.

The hardware configuration of the image processing apparatus illustrated in FIG. 9 is one example configuration. The hardware configuration according to the exemplary embodiment is not limited to the configuration illustrated in FIG. 9, and any other configurations are applicable as long as the configuration is able to implement the modules described above in the exemplary embodiment. For example, some of the modules may be constituted by dedicated hardware (for example, an application specific integrated circuit (ASIC)). Some of the modules may be provided in an external system and may be connected via a communication network. Further, plural systems each having the configuration illustrated in FIG. 9 may be connected to one another via a communication network so that the systems operate in cooperation with one another. Further, some of the modules may be incorporated into a copier, fax, scanner, printer, or multi-function peripheral.

The target of power control according to the exemplary embodiment may include, in addition to the image forming module 160 and so forth, a post-processing apparatus (also referred to as a finisher, an apparatus having functions of punching, stapling, and paper folding).

A priority function may be set for each apparatus. For example, settings may be performed so that a scan process by the image reading module 165, fax transmission by the communication module 170, a process of accessing the memory module 175, and so forth are not subjected to power reduction.

In the case of performing a process by plural apparatuses in cooperation with one another, the plural apparatuses are regarded as a target. In this case, a host apparatus among them may be set, an amount of power may be calculated from an effective processing time of the process performed by the apparatuses in cooperation with one another, and a reduction level for each apparatus may be set. Here, the amount of power may be average power of each apparatus.

A process whose processing time is equal to or longer than a predetermined threshold may be regarded as a target of power control.

The above-described program may be provided by storing it in a recording medium, or may be provided via a communication medium. In this case, for example, the above-described program may be regarded as "a computer readable recording medium storing a program".

"The computer readable recording medium storing a program" is a computer readable recording medium storing a program and used for installing, executing, or circulating the program.

Examples of the recording medium include a digital versatile disc (DVD), for example, the standards defined by the DVD forum: DVD-R, DVD-RW, DVD-RAM, and so forth, and the standards defined by DVD+RW: DVD+R, DVD+RW, and so forth; a compact disc (CD), for example, a read only memory (CD-ROM), a CD recordable (CD-R), a CD rewritable (CD-RW), and so forth; a Blu-ray® Disc; a magneto-optical (MO) disc; a flexible disk (FD); a magnetic tape; a hard disk; a read only memory (ROM); an electrically erasable and programmable ROM (EEPROM®); a flash memory; a random access memory (RAM); and a secure digital (SD) memory card.

The above-described program or part of the program may be stored or circulated by recording it on the recording medium. Alternatively, the program or part of the program may be transmitted through communication, for example, using a wired network such as a local area network (LAN), a metropolitan area network (MAN), a wide area network (WAN), the Internet, an intranet, or an extranet, or a wireless communication network, or a transmission medium that is obtained by combining the wired and wireless networks. Alternatively, the program or part of the program may be carried using carrier waves.

Further, the above-described program may be part of another program, or may be recorded on a recording medium together with another program. Alternatively, the program may be recorded on plural recording media in a distributed manner. The manner in which the program is recorded is not specified as long as the program is able to be compressed, encrypted, and restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor comprising:
  a first control module configured to control an output unit, the output unit being configured to output an image;
  a second control module configured to control a reading unit, the reading unit being configured to read an image; and
  a third control module configured to control, in response to receipt of a power reduction request, the first control module or the second control module to restrict performance of the output unit or the reading unit so as to satisfy the power reduction request; and
a detecting unit configured to produce a detection result indicating whether an operator is present,
wherein the third control module is configured to, in response to the detection result indicating that the operator is present, and in response to the reading unit and the output unit being used, control the first control module to restrict performance of the output unit so as to satisfy the power reduction request, and control the second control module to refrain from restricting performance of the reading unit,
wherein the third control module is configured to, in response to the detection result indicating that no operator is present and in response to the reading unit and the output unit being used:
  control the second control module to reduce an amount of power consumed by the reading unit to a reduced amount of reading unit power, wherein the reduced amount of reading unit power is equal to a predetermined percentage of a normal amount of reading unit power; and
  control the first control module to reduce an amount of power consumed by the output unit to a reduced amount of output unit power, wherein the reduced amount of output unit power is equal to the predetermined percentage of a sum of a normal amount of output unit power and the reduced amount of reading unit power.

2. The image processing apparatus according to claim 1, wherein the third control module is further configured to control the second control module to control the reading unit such that a reading speed in the reading unit matches a speed in the output unit.

3. The image processing apparatus according to claim 1, wherein the processor is further configured to execute:
a fourth control module configured to control a memory, the memory being configured to store an image,
wherein, in response to the memory and the output unit being used, the third control module is configured to control the first control module to restrict the performance of the output unit so as to satisfy the power reduction request.

4. The image processing apparatus according to claim 1, wherein the power reduction request comprises a request to reduce an amount of power consumed by the entire image processing apparatus by the predetermined percentage.

5. The image processing apparatus according to claim 1, wherein the third control module is configured to, in response to the detection result indicating that no operator is present and in response to the reading unit, the output unit, and the memory being used:
  control the second control module to reduce an amount of power consumed by the reading unit to a reduced amount of reading unit power, wherein the reduced amount of reading unit power is equal to a predetermined percentage of a normal amount of reading unit power; and
  control the first control module to reduce an amount of power consumed by the output unit to a reduced amount of output unit power, wherein the reduced amount of output unit power is equal to the predetermined percentage of a sum of a normal amount of output unit power, a normal amount of memory power, and the reduced amount of reading unit power.

6. An image processing method comprising:
controlling an output unit configured to output an image;
controlling a reading unit configured to read an image;
detecting whether an operator is present;
in response to receipt of a power reduction request, in response to a detection result indicating that the operator is present, and in response to the reading unit and the output unit being used, restricting the performance of the output unit so as to satisfy the power reduction request, and refraining from restricting the performance of the reading unit; and
in response to receipt of a power reduction request, in response to the detection result indicating that no operator is present, and in response to the reading unit and the output unit being used:
  reducing an amount of power consumed by the reading unit to a reduced amount of reading unit power, the reduced amount of reading unit power being equal to a predetermined percentage of a normal amount of reading unit power; and
  reducing an amount of power consumed by the output unit to a reduced amount of output unit power, the reduced amount of output unit power being equal to the predetermined percentage of a sum of a normal amount of output unit power and the reduced amount of reading unit power.

7. A non-transitory computer readable medium storing a program causing a computer to execute a process, the process comprising:
controlling an output unit configured to output an image;
controlling a reading unit configured to read an image;
detecting whether an operator is present;
in response to receipt of a power reduction request, in response to a detection result indicating that the operator is present, and in response to the reading unit and the output unit being used, restricting the performance of the output unit so as to satisfy the power reduction request, and refraining from restricting the performance of the reading unit; and
in response to receipt of a power reduction request, in response to the detection result indicating that no operator is present, and in response to the reading unit and the output unit being used:
  reducing an amount of power consumed by the reading unit to a reduced amount of reading unit power, the reduced amount of reading unit power being equal to a predetermined percentage of a normal amount of reading unit power; and reducing an amount of power consumed by the output unit to a reduced amount of output unit power, the reduced amount of output unit power being equal to the predetermined percentage of a sum of a normal amount of output unit power and the reduced amount of reading unit power.

\* \* \* \* \*